(12) United States Patent
DeGroot et al.

(10) Patent No.: US 6,234,304 B1
(45) Date of Patent: *May 22, 2001

(54) CONVEYOR BELT JOINT

(75) Inventors: Michael DeGroot, Grand Rapids; S. Luke Dickson, Belmont; Victor Tidd, Lowell, all of MI (US)

(73) Assignee: Mol Belting Company, Grand Rapids, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,820

(22) Filed: Jan. 28, 1998

(51) Int. Cl.[7] .............................. B65G 17/00; F16G 3/00; F16G 7/00
(52) U.S. Cl. ........................................ 198/844.2; 474/253
(58) Field of Search .............................. 198/844.2; 24/38; 474/253

(56) References Cited

U.S. PATENT DOCUMENTS

| | | | |
|---|---|---|---|
| 1,899,067 | * | 2/1933 | Trumbull ........................ 24/38 X |
| 2,069,362 | * | 2/1937 | Ford ................................ 24/38 X |
| 2,681,486 | * | 6/1954 | Carter ................................. 24/38 |
| 3,300,826 | | 1/1967 | Read . |
| 3,342,656 | | 9/1967 | Papageorges . |
| 3,351,508 | * | 11/1967 | Baxendale ..................... 156/159 X |
| 3,436,978 | | 4/1969 | Rahmes . |
| 3,558,390 | | 1/1971 | Habegger . |
| 3,693,218 | * | 9/1972 | Jaubert et al. ............... 198/844.2 X |
| 4,034,617 | * | 7/1977 | Guyer ........................... 198/844.2 X |
| 4,050,322 | | 9/1977 | Moring . |
| 5,487,707 | * | 1/1996 | Sharf et al. .......................... 474/253 |
| 5,531,316 | * | 7/1996 | Savino ............................. 198/844.2 |
| 5,670,230 | * | 9/1997 | Schlueter, Jr. et al. ....... 198/844.2 X |

FOREIGN PATENT DOCUMENTS

| | | |
|---|---|---|
| 36 05 186 A1 | 8/1987 | (DE) . |
| 41 18 373 A1 | 12/1992 | (DE) . |
| 0 134 545 | 4/1985 | (EP) . |
| 0 188 660 | 7/1986 | (EP) . |
| 0 307 249 | 3/1989 | (EP) . |
| 2 059 539 | 4/1981 | (GB) . |
| 2 232 636 | 12/1990 | (GB) . |
| 2 256 181 | 12/1992 | (GB) . |
| 97/37834 | 10/1997 | (WO) . |

OTHER PUBLICATIONS

European Search Report, 99200257.6–2311, Feb. 4, 2000.

* cited by examiner

Primary Examiner—Christopher P. Ellis
Assistant Examiner—Gene O. Crawford
(74) Attorney, Agent, or Firm—Rader, Fishman, Grauer & McGarry, An Offices of Rader, Fishman & Grauer PLLC

(57) ABSTRACT

A length of conveyor belt is provided with end sections of fusible material, such as the thermoplastic material, at opposite ends. A continuous belt is formed by the application of heat to end portions of the fusible end sections and by joining by the fusible end sections to each other and cooling the joined end sections.

22 Claims, 2 Drawing Sheets

CONVEYOR BELT JOINT

BACKGROUND OF THE INVENTION

1. Field of the Invention

This invention relates to conveyor belts and more particularly to a conveyor belt made of conveyor belt material and having opposite ends, each provided with an end portion of belt-joining material adapted to facilitate joining opposite ends in the forming of a continuous conveyor belt.

2. Background Art

Endless conveyor belts, which are used in numerous applications, are typically formed either by linking the opposite ends of the belt in a standard fashion, for example, by means of laces or the like or by vulcanizing, welding or gluing the opposite ends together. In many applications, a vulcanized belt is preferred over a laced belt. Particularly, where sanitation is a concern, such as in food handling or the like, laced belts are often not acceptable because of sanitary requirements. In other applications, product may be marred or scratched by the laced joint. It is generally recognized in the belting industry that belts having opposite ends joined by vulcanization or the like, are preferred over laced belts.

Since there is considerable wear on conveyor belts in operation, the belts must be replaced from time to time. As a rule, replacement of a belt requires the new belt to be properly installed on the conveyor and to be joined after installation. The joining of the two ends of the belt by means of laces is a relatively fast process. However, the joining of opposite ends of a belt by means of the standard vulcanization or welding process at time of installation or replacement of a belt requires special machinery to apply high pressure and typically requires several hours to complete. An serious disadvantage of this process is the down time associated with the process.

SUMMARY OF THE INVENTION

In accordance with the present invention, opposite ends of a belt section are provided a readily fusible material and a continuous belt is formed by joining the two fusible sections at the opposite ends of the belts. The joining of the opposite ends of the belt section is accomplished by a simplified process in a small fraction of the time typically required for vulcanization of belt ends by prior art processes. Advantageously, the down time and loss of usable hours of the conveyor arrangement is greatly reduced.

In accordance with one aspect of the invention, a section of material comprising primarily a polyurethane resin, known as B. F. Goodrich Estane polyurethane resin, added to opposite ends of a belt section and the end sections are joined together by application of heat for a relatively short period of time. Besides polyurethane resin, other thermoplastics, such as thermoplastic polyesters (e.g., Hytrel, Arnitel), thermoplastic rubber (e.g., Santoprene, etc.), EPDM, PeBax, etc. would also work.

In accordance with another aspect of the invention, the thickness of the belt in areas adjacent the opposite ends is reduced and a section of the resin is added to each of the reduced thickness end areas, extending a short distance beyond each of the opposite belt ends. At time of installation, the resin end sections are positioned adjacent each other and heat is applied to the opposing resin end sections by means of a heating wand or the like. When the resin end sections have been heated to a melting temperature, the heating wand is removed and the opposing ends of the belt are joined together to form a seam.

Advantageously, in accordance with this invention, the time required for joining the opposite ends of a belt is reduced to minutes rather than hours typically required for the joining opposite ends of fabric belts in accordance with the prior art. Furthermore, the large equipment for joining fabric belts in accordance with the methods of the prior art, is not required.

BRIEF DESCRIPTION OF THE DRAWINGS

An illustrative embodiment of the invention is described below with reference to the drawing in which.

DETAILED DESCRIPTION

Figure 1:
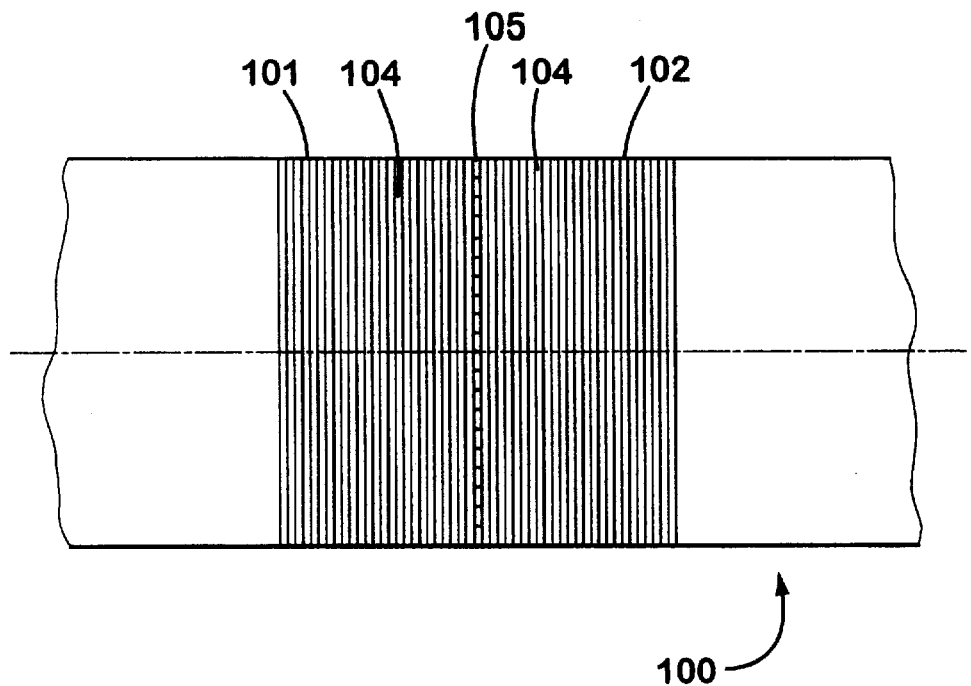
FIG. 1 is a plan view of a belt joined in accordance with the principal of the present invention.

Shown in FIG. 1 in a breakaway view are opposing end sections 101, 102 of a conveyor belt 100 joined along a seamed joint 105 made in accordance with the invention. The conveyor belt 100 preferable has a fabric base layer or carcass, consisting of several layers of fabric material covered in a standard fashion, and a top layer of synthetic material or natural rubber, or the like joined to the carcass. In a typical belt construction, the cover layer of the belt may be formed with a plurality of embossments. As described further later herein, the joint 105 is formed by first joining an end piece of a material consisting primarily of a thermoplastic material, such as polyurethane resin, for example B. F. Goodrich Estane resin, to the underside of the carcass of the opposing end sections 101, 102. Heat is applied to the polyurethane resin end pieces on the opposing end sections of the belt and the end sections are joined to form the joint 105. The joint 105 may extend perpendicularly to opposite sides of the belt, as depicted in FIG. 1, or at an angle as depicted in FIG. 5 at skewed angle to the opposite sides of the belt to provide a longer seam area.

Figure 2:
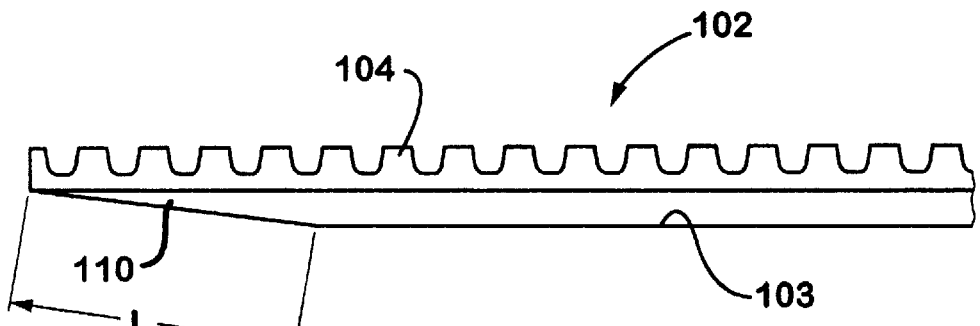
FIG. 2 is a side elevational view of one end of the belt provided with a skived end section.
Figure 4:
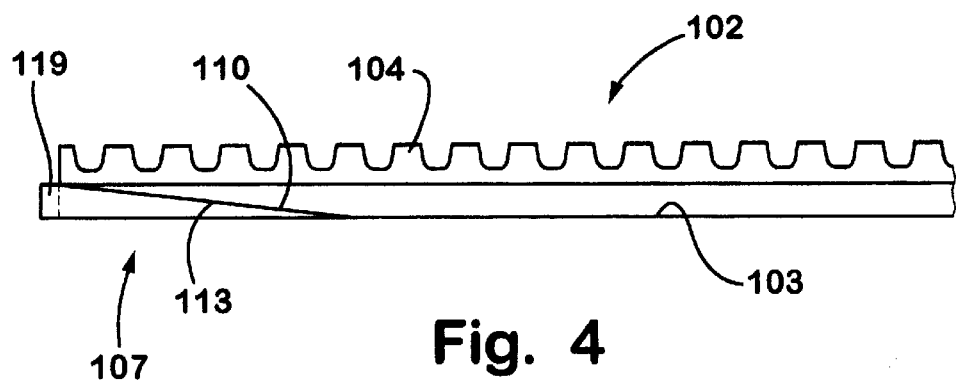
FIG. 4 is side elevational view of the end piece of FIG. 3 jointed to the end section of FIG. 2.

Shown in FIG. 2, in a side elevational view, is the end section 102 of the belt 100. The fabric carcass of the belt is designated at 103 and a belt cover layer is depicted in FIG. 4. An end portion 110 of the carcass 103 has been skived to accept a portion of the polyurethane resin. The skiving shown in FIG. 2 is a bevel preferably sloping at approximately at 15°. In one specific application, the length l of the skive is on the order of 5 centimeter. A step splice, in which the ends of each layer are squarely cut, rather than beveled, or a finger splice, or a finger-step-finger splice, may be used as well for the purposes of the invention as outlined in this application. The various splicing techniques are well known and commonly used in the splicing of multi-layered belts.

Figure 3:
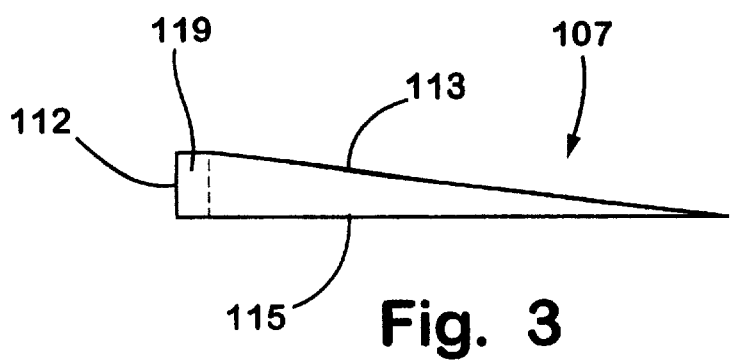
FIG. 3 is a side elevational view of an end piece of polyurethane resin prepared to be joined to the one end of the belt of FIG. 2.

FIG. 3 is a side elevational view of one example of a polyurethane resin end piece 107 adapted to be joined to the end portion 110 of the end section 102 the use of a skived joint. It will be understood that other end pieces constructions for use with other known joining configurations, such as a finger splice or a step splice, or combinations thereof may be readily devised. The end piece 107 comprises a vertically extending end surface 112 and a sloping surface 113. The length of the sloping surface 113 of end piece 107 corresponds to the length l of skived end portion 110 of the end section 102 shown in FIG. 2. The angle between the lower surface 115 and the sloping surface 113 is preferably on the order of 15°. The end 107 is provided with non-sloping end 119 designated by a broken line in FIG. 3 and extending beyond the sloping portion under the surface 113. FIG. 4 shows the section 107 joined to the skived end portion 110 of the end section 103. The non-sloping end 119 extends beyond the terminating end of the section 103 by a short distance, e.g., on the order of 2 or 3 mm. The end 119 is at least partially melted when opposing end sections are joined to form a seam.

Figure 5:
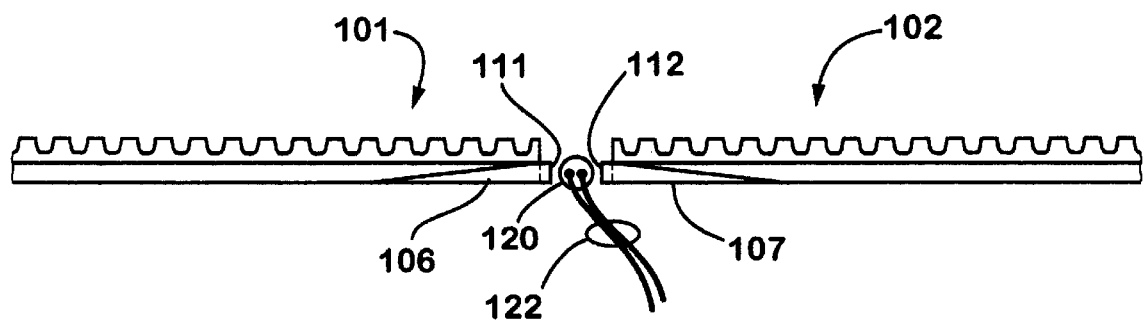
FIG. 5 is a side elevational view of opposing belt ends each provided with an end piece and a heating wand.

Depicted in FIG. 5 is the end section 102 provided with the polyurethane resin end piece 107 and the end section 101 provided with the polyurethane end piece 106 formed and attached in a similar manner as end piece 107. The end pieces 106 and 107 may be attached to the belt end sections 101 and 102, respectively, by the use of a high strength glue such as the commercially available glue known as Plastibond which is commercially available from Bonding Solutions company or a glue such as the well known Rema's Plastic Cement.

The side elevation of FIG. 5 shows the end sections 101, 102, spaced apart and a heating wand 120 disposed between the opposing polyurethane resin end pieces 106 and 107. The heating wand 120 may, for example, be an Andro Splice tool, which is commercially available, and may be connected to an electrical supply by means of wires 122. Heating wand 120 is preferably heated to a temperature of approximately 550° F. and kept in contacted with the opposing end surfaces 111, 112 of the sections 106, 107, respectively, under a relatively low pressure of on the order of approximately 30 psi for approximately 8 seconds. Thereafter, the wand 120 is removed and the ends are held in an abutting position under a pressure of approximately 30 psi and cooled to room temperature.

Figure 6:
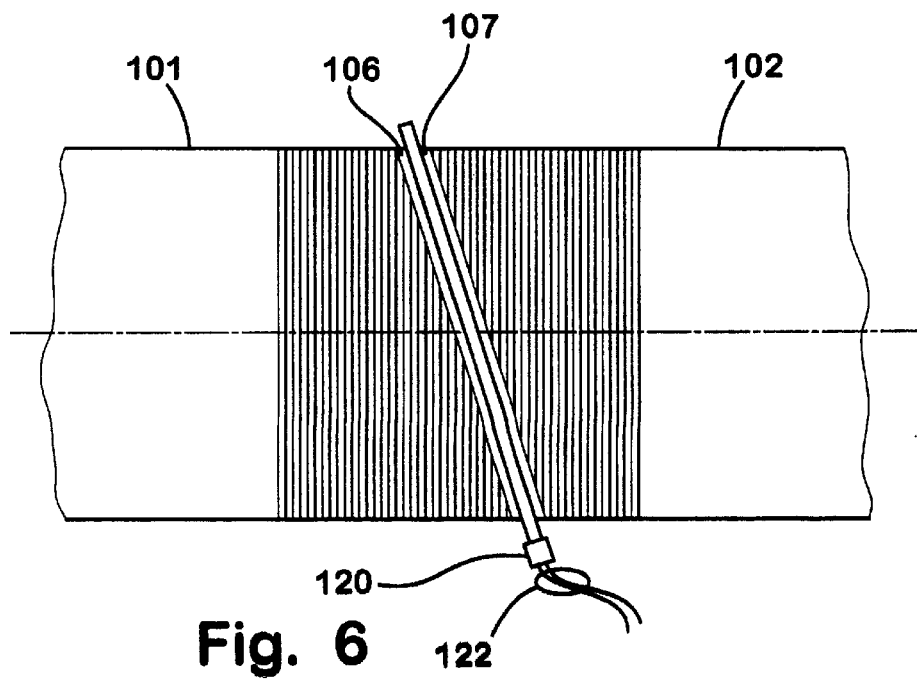
FIG. 6 is a plan view of opposing belt ends formed at an angle and a heating wand disposed between opposing ends.

FIG. 6 shows an alternate embodiment of the invention in which the end sections 101, 102 are cut at an angle and end pieces 106, 107 extend at substantially the same angle. The configuration of FIG. 6 is preferred when small end rollers or pulleys are present and to minimize the so-called hinge effect.

It will be understood that the above-described embodiments are merely illustrative of the invention and that other arrangements may be devised without departing from the scope of the invention as defined in the appended claims.

What is claimed is:

1. A conveyer belt comprising first and second end sections and a joint joining the first and second end sections, the joint comprising:
   a first end piece attached to the first end section and a second end piece attached to the second end section, the first and second end pieces each consisting essentially of a thermoplastic resin and joined along a seam formed from the first and second end pieces.

2. The conveyer belt in accordance with claim 1 wherein the conveyer belt comprises a base layer and a top layer joined to the base layer and wherein the first and second end pieces are joined to portions of the base layer of the first and second end sections.

3. The conveyer belt in accordance with claim 2 wherein the first and second end sections each have a terminating end adjacent the seam and wherein the first end piece extends beyond the terminating end of the first end section and the second end piece extends beyond the terminating end of the second section.

4. The conveyer belt in accordance with claim 1 wherein the seam is formed by heating and joining the first and second end pieces.

5. The method in accordance with claim 1 wherein the thermoplastic resin consists essentially of polyurethane resin.

6. A method of joining first and second opposing ends of a length of a conveyer belt, the method comprising the steps of:
   forming first and second end pieces of a thermoplastic resin, each having an attachment end and a free end;
   joining the attachment end of the first end piece to the first opposing end;
   joining the attachment end of the second end piece to the second opposing end;
   applying heat to the free end of each of the end pieces;
   joining the free ends of the first and second end pieces to each other; and
   cooling the end pieces while maintaining the end pieces in the joined state under a predefined pressure for a predefined period of time, thereby joining the opposing ends of the conveyer belt.

7. The method in accordance with claim 6 wherein the step of applying heat to the free end of each of the end pieces comprises:
   positioning the opposite ends of the conveyer belt opposite each other such that the end pieces are adjacent one another and spaced apart;
   positioning a heating wand between the spaced apart end pieces and immediately adjacent the two end pieces;
   activating the heating wand to apply heat to the end surfaces until at least a portion of each of end pieces reaches a melting temperature;
   removing the heating wand; and
   joining the two end pieces.

8. The method in accordance with claim 6 wherein the steps of joining the attachment ends to the opposing ends comprises joining the attachment ends such that the free ends of the first and second end pieces each extend beyond one the opposing ends of the length of the conveyer belt.

9. The method in accordance with claim 6 wherein the thermoplastic resin consists essentially of polyurethane resin.

10. A method of joining first and second opposing ends of a length of conveyer belt comprising a base layer and a top layer joined to the base layer, the method comprising the steps of:
   forming first and second end pieces of a fusible material, each having an attachment end and a free end;
   joining the attachment end of the first end piece to the first opposing end;
   joining the attachment end of the second end piece to the second opposing end;
   applying heat to the free end of each of the end pieces;
   joining the free ends of the first and second end pieces to each other; and
   cooling the end pieces while maintaining the end pieces in the joined state under a predefined pressure for a predefined period of time, thereby joining the opposing ends of the conveyer belt; and
   skiving a portion of the base layer adjacent each of the opposing ends from a lower side of the base layer toward the top layer to form a skived belt end portion, the step of forming the end pieces comprises providing each end piece with a substantially flat lower surface, an end surface and an upper surface, at least a portion of the upper surface extending angularly from a position adjacent the flat lower surface toward the end surface, and wherein the steps of joining the attachment ends of the first and second end pieces to the opposing ends comprise attaching the upper surface of one of the end pieces to each skived belt end portion.

11. The method in accordance with claim 10 wherein the steps of forming the first and second end pieces each comprise forming each end piece with an end portion having a flat upper surface portion extending substantially parallel to the flat lower surface and wherein the steps of joining the first and second end pieces to the opposing ends comprise joining the end portions to the opposing ends such that at least a part of the flat upper surface portions extend beyond the opposing ends of the length of conveyer belt.

12. A conveyer belt comprising:
   a base layer having an upper surface and a lower surface and terminating in first and second end sections, with each of the end sections comprising an end surface extending between the upper surface and the lower surface; and
   a joint comprising a first end piece attached to the first end surface and a second end piece attached to the second end surface, at least one of the first and second end pieces having an extension portion that extends beyond a terminating edge of the corresponding one of the first and second end section, and the first and second end pieces each consisting essentially of a fusible material and the extension portion of the at least one of the first and second end portion is joined with the other of the at least one of the first and second end portion to form a seam between the first and second end sections.

13. The conveyor belt in accordance with claim 12 wherein a base leading edge is formed by the intersection of the end surface and the one of the upper surface and lower surface and a base trailing edge is formed by the intersection of the end surface and the other of the one of the upper surface and the lower surface.

14. The conveyor belt in accordance with claim 13 wherein the end surface is substantially planar such that a cross section of the end surface forms a substantially straight line extending between the leading edge and the trailing edge.

15. The conveyor belt in accordance with claim 12 wherein each of the first and second end pieces has an extension portion that extends beyond a terminating edge of the corresponding first and second end section and the extension portions are joined to form the seam.

16. The conveyor belt in accordance with claim 15 wherein a leading edge is formed by the intersection of the end surface and one of the upper surface and lower surface and a trailing edge is formed by the intersection of the end surface and the other of the one of the upper surface and the lower surface.

17. The conveyor belt in accordance with claim 16 wherein the leading edge is formed by the intersection of the end surface and the upper surface.

18. The conveyor belt in accordance with claim 17 wherein the end surface is substantially planar such that a cross section of the end surface forms a substantially straight line extending between the leading edge and the trailing edge.

19. The conveyer belt in accordance with claim 15 and further comprising a top layer mounted to the upper surface of the base layer.

20. The conveyor belt in accordance with claim 19 wherein the top layer terminates at the terminating edge of the first and second end sections.

21. The conveyor belt in accordance with claim 20 wherein the base layer is a fabric material and the top layer is a synthetic material.

22. A conveyer belt comprising a base layer and a top layer joined to the base layer and first and second end sections and a joint joining the first and second end sections and comprising a first end piece attached to the first end section and a second end piece attached to the second end section, the first and second end pieces each consisting essentially of a thermoplastic resin joined to portions of the base layer of the first and second end sections;
   the first and second end sections each comprising an end surface and a sloped lower surface adjacent the end surface and extending at an angle from a lower surface of the base layer toward the top layer and terminating on the end surface;
   the end pieces each comprising a lower surface disposed in alignment with the lower surface of the base layer and a sloped upper surface disposed adjacent the sloped lower surface of one of the end sections.

* * * * *